Patented June 17, 1947

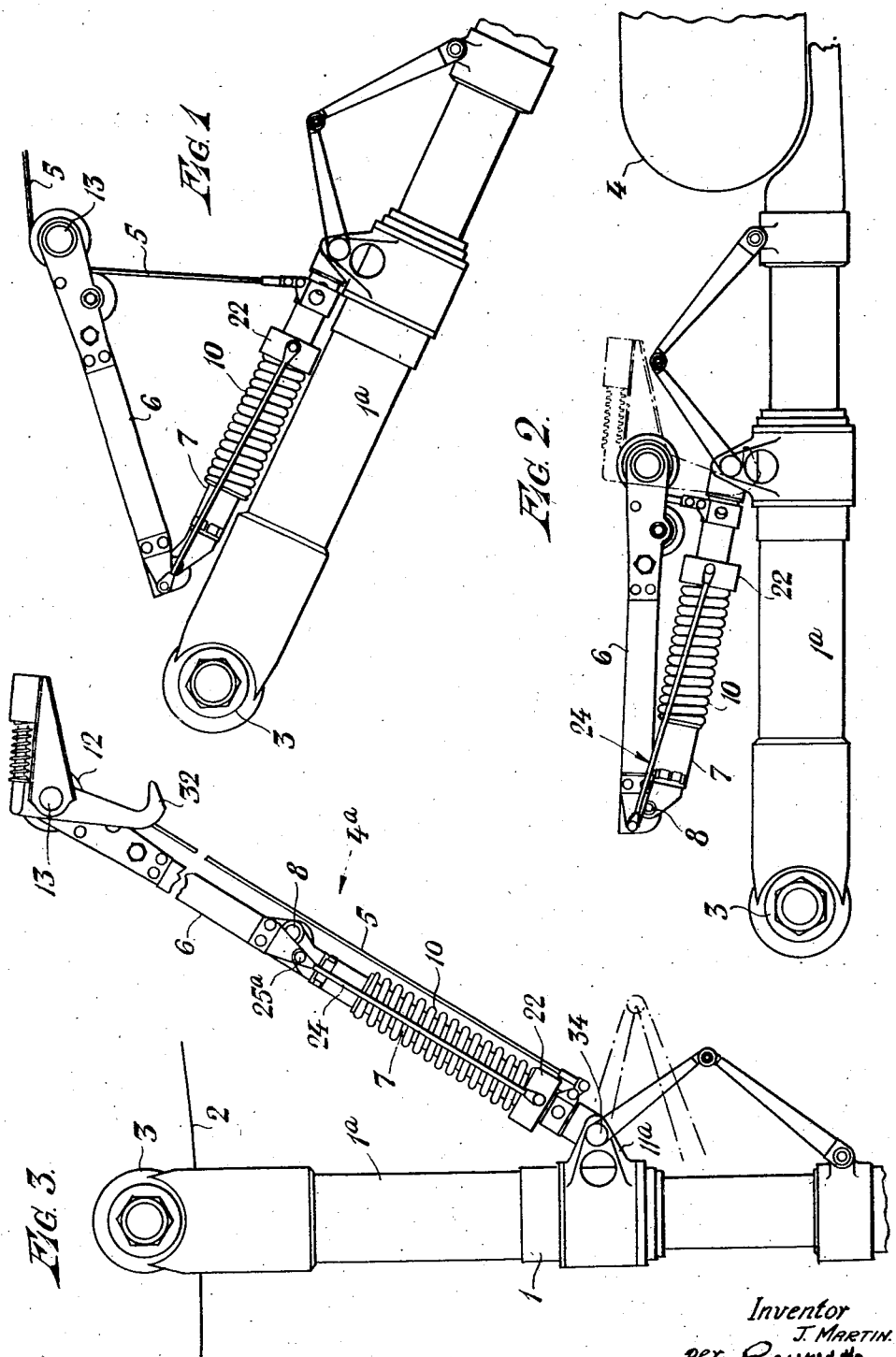

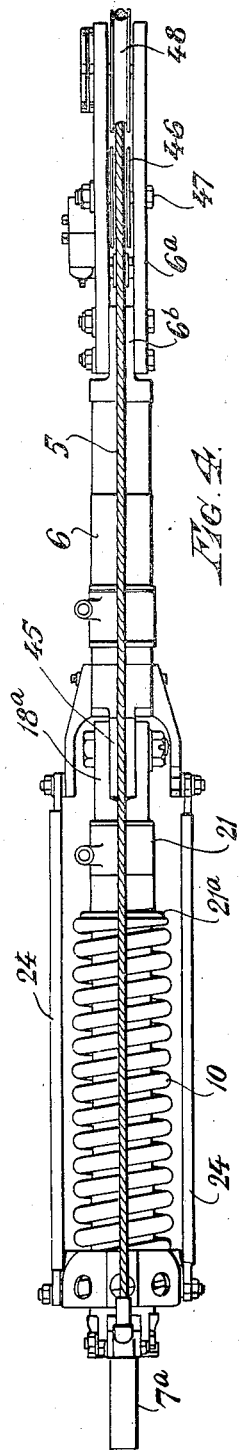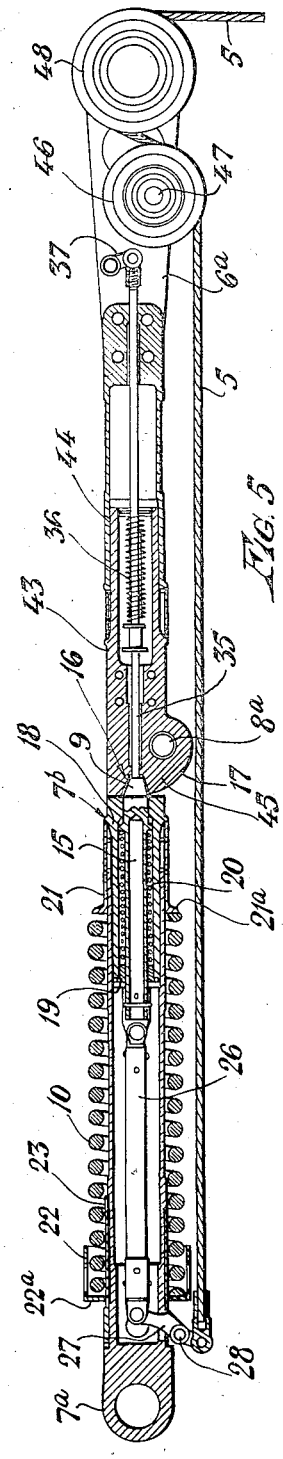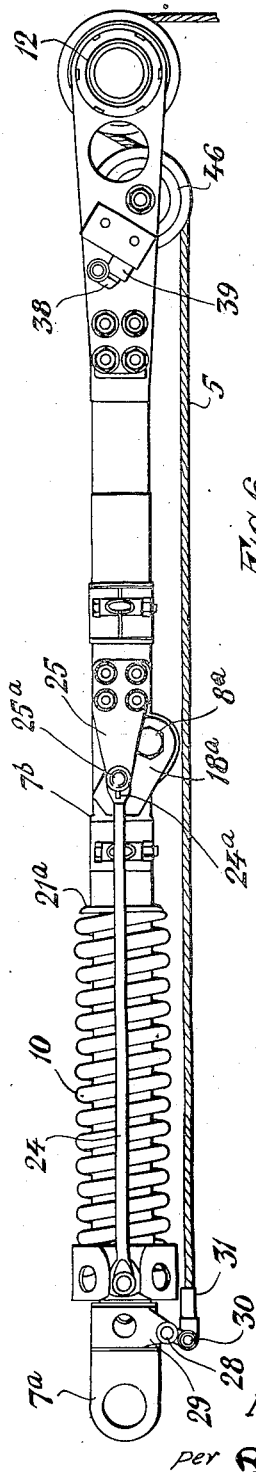

2,422,576

UNITED STATES PATENT OFFICE 2,422,576

MECHANISM FOR RETRACTING AND AUTOMATICALLY LOCKING UNDERCARRIAGES OF AIRCRAFT

James Martin, Higher Denham, near Uxbridge, England

Application June 25, 1943, Serial No. 492,286
In Great Britain July 15, 1942

1 Claim. (Cl. 244—102)

This invention relates to improved means for automatically locking and strutting oleo or other resilient legs of aircraft undercarriages in the operative position and for collapsing or folding such locking and strutting means into a compact space in close proximity to the folded or raised legs, and the chief object of the invention is to provide a quick action lowering mechanism which is positive in its locking operation and is gravity and spring operated so as to obviate the necessity of complicated driving mechanism. Another object of this invention is to provide an improved collapsible radius rod or strut incorporating means to automatically lock the oleo leg or the like in the operative position and to automatically unlock the leg to release it for raising or folding as soon as driving means is set into operation to raise or fold the leg.

According to this invention an oleo, or oleo pneumatic type of undercarriage or other suitable shock absorbing undercarriage for aircraft has its wheel carrying leg strutted in the lowered or operative position by a radius rod comprising two arms hinged together at adjacent ends by a knuckle joint so that they may be abutted end to end substantially in coaxial alignment in the strutting position and folded towards each other when retracting the undercarriage, one of said arms being adapted to be pivoted at its end remote from the knuckle joint to the leg, and the other arm being adapted to be pivoted to the aircraft, means provided with said arms in juxtaposition to said knuckle joint to automatically lock the two arms rigidly together when they are moved to the substantially coaxial relationship, spring means urging said arms to the leg strutting position when the two arms have been moved apart through a predetermined angle, said spring means yieldingly opposing said movement apart of the arms through said angle, the said locking means being adapted to be connected for unlocking operation to the means for retracting the leg to the folded away position.

In the preferred form of the present invention, the said radius rod consists of two arms united by a knuckle joint so that they may be folded close together in the inoperative position, means being provided with the knuckle joint to lock the two arms in substantially co-axial alignment when the leg is lowered, spring means to positively force the two arms into fully extended or operative relationship following a predetermined movement of the leg by gravity and remote control operated means to release the lock and to pull the leg to the raised position.

In order that this invention may be clearly understood and readily carried into effect drawings are appended hereto illustrating an embodiment thereof, and wherein, Fig. 1 is a broken front elevation view showing the undercarriage retracted, Fig. 2 is a broken front elevation view showing the undercarriage lowered to an extent in which tie rods hereinafter described form a dead centre position with the axis of a knuckle joint pivotally connecting two arms of the radius rod, Fig. 3 is a broken front elevation view showing the undercarriage fully lowered, Fig. 4 is a view of the extended tie rod taken in the direction of the arrow 4ᵃ of Fig. 3.

Fig. 5 is a longitudinal sectional side elevation of Fig. 4, and

Fig. 6 is an outside side elevation view of Fig. 4.

Referring to the drawings the cylinder 1ᵃ of oleo leg 1 is pivoted at one end to the appropriate part of the aircraft 2 by a bolt and suitable bearings indicated generally by the reference numeral 3, and the leg carries the wheel 4 at its end remote from its pivot 3 in well known manner.

The leg 1 is adapted to be raised by the tension of a cable 5 connected at one end to suitable winding or driving mechanism inside the aircraft and anchored at its other end to the leg in a manner hereinafter explained through the medium of a collapsible radius rod constituted by two arms 6 and 7 connected together by a knuckle joint 8. The initial retracting or lifting tension on the cable 5 is arranged to disengage a locking catch member 9 (see Fig. 4) as hereinafter described and then to relieve the knuckle joint of the influence of a coiled compression spring 10 which normally functions to force the arms 6 and 7 of the radius rod into co-axial relationship and to maintain them in the fully strutting position. When the knuckle joint is relieved of the influence of the spring 10, the joint may be readily broken to allow the arms to fold and the undercarriage to be raised.

The arm 7 of the radius rod is pivoted at one end by a lug 7ᵃ thereon to a bifurcated lug 11 on the outer end of the cylinder 1ᵃ of the leg, and the relatively remote end of the other arm 6 is fixed to an outer ring of a ball bearing 12 located on a fixed pivot pin 13 in a bracket 14 fixed to the appropriate part of the aeroplane wing or fuselage. These two arms 6 and 7 are both mainly of tubular section and are co-axial when the under-carriage is down. The lower of these two arms of the radius rod, i. e. the arm 7 pivoted to the cylinder of the leg, accommodates at its knuckle joint end a spring loaded locking plunger 15 shaped at one end to form the said catch 9, such catch being adapted to trip into a recess 16 (see Fig. 5) in the free end of the upper arm 6, for which purpose such free end is camshaped as at 17 to enable the catch end 9 of the plunger 15 to slide thereover until it trips into the said recess. This plunger 15 slides concentrically in a tubular housing 18 screwed into the inner end of the tubular arm 7, a plug or annular retaining nut 19 being threaded into the end of such housing inside this arm to form an abutment for one end of a coiled compression spring 20 encircling the plunger and abutting at its other end against an annular stop 15a on the plunger. This housing 18 is bored axially at its end nearer the knuckle joint to slidably accommodate the exposed or catch end 9 of the plunger 15, such catch end of the plunger being tapered and radiused at its corners as shown in Fig. 5, to engage smoothly in the correspondingly tapered recess 16 of the said camshaped end 17 of the upper arm 6 of the radius rod. The housing 18 is bifurcated at one end as at 18a to form part of the knuckle joint of the radius rod, the other part being the said camshaped end 17 of the upper arm, a hinge pin 8a being passed through such lugs and the said end of the upper arm, the axis of this hinge pin being offset in relation to the axis of the extended radius rod.

A sleeve 21 loose on the inner end of the lower arm 7 of the radius rod abuts against a flange 7b thereon, the other end of this sleeve being flanged as at 21a to form an abutment for the inner end of a stout coiled compression spring comprising the beforesaid spring 10 encircling the lower arm 7 and which positively forces the two arms of the radius rod into the fully extended position or co-axial relationship. The other end of this spring abuts against a flange 22a on a thrust collar 22 cupped to encircle this end of the spring and carried by a sleeve 23 having freedom for limited sliding movement upon the said lower arm. The thrust collar is connected by a pair of slotted tie rods 24 to a pair of fork ends 25 on the upper arm 6 which project beyond the pivot (hinge pin 8a) of the offset knuckle joint. The slots in the tie rods 24 are indicated by the reference numeral 24a and they receive studs 25a of the fork ends 25. The spring 10 thus exerts a strong influence on the knuckle joint to ensure the completion of movement of the two arms into the fully extended co-axial position. In order to break the knuckle joint of the radius rod when it is desired to retract the undercarriage the locking plunger 15 with its catch 9 has to be retracted and this spring 10 slightly compressed so that the slotted tie rods 24 no longer transmit its force to the fork ends 25 of the upper arm 6 of the radius rod and the knuckle joint is relieved of the influence of the spring.

This latter dual operation is effected by the initial pull on the operating cable 5 and for this purpose the locking plunger 15 is connected inside the arm 7 by a push rod 26 to one end of a small lever 27 pivoted by a bolt 28 to and between a pair of lugs 29 formed on the said sleeve 23 carrying the said thrust collar. The outer end of this lever has pinned to it by a pivot bolt 30 one end of a bush or thimble 31 in which is fixed the appropriate end of the said cable 5 so that the initial operative pull of the cable 5 turns the lever 27 of the locking plunger push rod 26 slightly on a fulcrum afforded by its pivotal connection to the sleeve 23 thus withdrawing the catch end of the locking plunger 15 and unlocking the knuckle joint. When the inner end of the small lever 27 abuts against the closed end of the arm 7 as shown in broken lines in Fig. 5, then the small lever turns about this closed end as a fulcrum and further pull on the cable will move the thrust collar 22a to compress the spring 10 on the lower arm 7. Owing to the lost motion in the slotted connection of the tie rods 24 to the arm 6 the force exerted by the spring is no longer communicated to the fork ends 25 of the upper arm of the radius rod and the knuckle joint is easily broken. Further pull on the cable 5 folds up the two arms 6 and 7 of the radius rod and raises the leg of the undercarriage.

The axis of the pivot bolt 8a of the knuckle joint 8 of the two arms 6 and 7 of the radius rod is, as beforesaid, uni-lateral in relation to the axis of the extended radius rod and is slightly above the common axis of the two studs 25a engaged in the said slots 24a of the tie rods, the relative positions of these axes being such that when the leg has dropped about 25° the two tie rods are in a dead-centre position in relation to such axes as shown in Fig. 2. As soon as the dead-centre position is passed, the force exerted by the compression spring 10, through the tie rods 24, acts to turn the two arms 6 and 7 of the radius rod about the knuckle joint pivot bolt 8a until the knuckle joint snaps forcibly into the straight position and is locked by the locking catch 9. In this position the leg is fully down and is locked and braced by the radius rod.

A bifurcated pawl type of catch 32 engages automatically by the action of a spring 33 over a pair of radial pins 34 on the free end of the leg cylinder when the leg reaches its fully raised position. Remote control operated means (now shown) is provided to actuate such catch against the influence of its spring means to release the leg so that the leg and wheel will fall by gravity about the hinge of the leg when the undercarriage is to be lowered.

The beforesaid locking plunger can operate the means for indicating to the pilot that the leg is fully down, for which purpose the upper arm 6 of the two arms of the radius rod can accommodate an axially slidable plunger 35 loaded in the opposite direction to the locking plunger 15 by a weak spring 36, one end of this indicator operating plunger extending into the recess 16 in the outer end of such inner arm 6 into which the locking plunger catch end 9 trips so that the locking plunger presses the indicator operating plunger 35 upwards inside the radius rod as the locking action takes place. The other end of this indicator operating plunger passes through the top of the tubular part of the said inner arm and is connected with a small crank 37 pivoted between a forked inner end 6a of this arm 6, the pin of this crank carrying outside such forked end an arm 38 carrying a contact adapted to bridge contacts of a circuit closing device 39 connected to an electrically operated indicator on the instrument panel of the aircraft.

Similarly to the arm 7, the upper arm 6 can be formed in two sections by making the knuckle joint end of the arm 6 from a strong metal sleeve 43 threaded as at 44 into the tubular body part of the arm 6, the outer end of this sleeve being shaped to form a lug 45 to fit between the furcations 18ᵃ of the arm 7, such lug having the cam edge 17 formed thereon. The furcations 6ᵃ at the anchored or top end of the arm 6 can, as shown, comprise two plates bolted to a centre lug 6ᵇ of the arm 6, and between these furcations is located a pulley 46 rotating on a bolt 47, the cable 5 negotiating this pulley and another pulley 48 fitted about the bearing member 12 of the pivot of the radius rod.

The pulley 46 is so located that the tensioned cable 5 extends alongside the radius rod clear of the knuckle joint.

In referring to the wheel carrying member 1 as a leg it will be understood that it may be of single axis tubular form as shown, a parallel pair of leg members or a frame unit adapted to support one or a pair of wheels.

I claim:

In an aircraft retractable undercarriage, the combination of, a leg having a wheel rotatably mounted on one end and having the other end adapted to be pivotally mounted on an aircraft, a straight foldable strut having one end attached to said leg and the other end adapted to be attached to the aircraft, said strut comprising two arms connected by means of a joint, spring-actuated means mounted on said strut for forcing the arms of said strut into co-axial alignment a spring loaded pin slidably mounted in one of said arms and positioned to be projected by said spring across said joint, a recess in said other arm positioned to receive said pin to lock said joint when said arms are in coaxial alignment, the other end of said plunger being connected to a lever and the opposite end of said lever being connected to a cable arranged and positioned to fold said strut, whereby when tension is applied to said cable, said pin will be withdrawn and the joint unlocked just prior to the folding of said strut.

JAMES MARTIN.

REFERENCES CITED

The following references are of record in the file of this patent:

UNITED STATES PATENTS

| Number | Name | Date |
|---|---|---|
| 1,329,533 | McCarroll | Feb. 3, 1920 |
| 2,277,896 | Allbright | Mar. 31, 1942 |

FOREIGN PATENTS

| Number | Country | Date |
|---|---|---|
| 473,202 | Great Britain | Oct. 8, 1937 |
| 518,130 | Great Britain | Feb. 19, 1940 |